(12) United States Patent
Khor et al.

(10) Patent No.: US 8,504,865 B2
(45) Date of Patent: Aug. 6, 2013

(54) DYNAMIC PHASE ALIGNMENT

(75) Inventors: Choon Keat Khor, Kedah (MY); Yeong Seng Hoo, Penang (MY); Soon Chieh Lim, Penang (MY)

(73) Assignee: eASIC Corporation, Santa Clara, CA (US)

( * ) Notice: Subject to any disclaimer, the term of this patent is extended or adjusted under 35 U.S.C. 154(b) by 1709 days.

(21) Appl. No.: 11/737,994

(22) Filed: Apr. 20, 2007

(65) Prior Publication Data

US 2008/0263381 A1    Oct. 23, 2008

(51) Int. Cl.
  G06F 1/00      (2006.01)
  G06F 1/12      (2006.01)
  G06F 13/42     (2006.01)
  H04L 5/00      (2006.01)
  H04L 7/00      (2006.01)

(52) U.S. Cl.
  USPC .......................................... 713/500; 713/401

(58) Field of Classification Search
  USPC ............ 713/400, 500; 327/149, 153; 375/371
  See application file for complete search history.

(56) References Cited

U.S. PATENT DOCUMENTS

| | | | | |
|---|---|---|---|---|
| 4,847,874 A * | 7/1989 | Kroeger et al. | ............... | 375/360 |
| 5,436,659 A * | 7/1995 | Vincent | ......................... | 348/246 |
| 5,463,351 A * | 10/1995 | Marko et al. | .................... | 331/1 A |
| 6,286,119 B1 * | 9/2001 | Wu et al. | ...................... | 714/726 |
| 6,557,066 B1 * | 4/2003 | Crafts et al. | ................. | 710/305 |
| 6,714,612 B1 * | 3/2004 | Chaudry | ....................... | 375/368 |
| 6,914,953 B2 * | 7/2005 | Boerstler | ...................... | 375/373 |
| 7,143,312 B1 * | 11/2006 | Wang et al. | ..................... | 714/30 |
| 7,152,136 B1 * | 12/2006 | Charagulla | .................... | 710/315 |
| 7,372,928 B1 * | 5/2008 | Foley et al. | .................... | 375/354 |
| 7,639,737 B2 * | 12/2009 | Palmer | ......................... | 375/232 |
| 2003/0112909 A1 | 6/2003 | Best et al. | | |
| 2003/0122696 A1 | 7/2003 | Johnson et al. | | |
| 2004/0030513 A1 * | 2/2004 | Kocaman et al. | ............... | 702/79 |
| 2004/0042504 A1 * | 3/2004 | Khoury et al. | ................ | 370/518 |
| 2004/0088598 A1 * | 5/2004 | McLeod | ........................ | 713/503 |
| 2004/0101079 A1 | 5/2004 | Braceras et al. | | |
| 2004/0128460 A1 * | 7/2004 | Donnelly et al. | ............. | 711/167 |
| 2004/0153684 A1 | 8/2004 | Liu et al. | | |
| 2004/0186674 A1 * | 9/2004 | Hansen et al. | .................. | 702/79 |
| 2005/0114724 A1 * | 5/2005 | Wu | ................................ | 713/401 |
| 2005/0125709 A1 * | 6/2005 | McKim et al. | ................... | 714/25 |
| 2005/0249126 A1 * | 11/2005 | Chang et al. | ................... | 370/252 |
| 2005/0264338 A1 | 12/2005 | Berkram et al. | | |
| 2006/0250283 A1 * | 11/2006 | Lin | ................................. | 341/50 |
| 2007/0006053 A1 * | 1/2007 | Otto et al. | ...................... | 714/700 |
| 2007/0046346 A1 * | 3/2007 | Minzoni | ........................ | 327/158 |

OTHER PUBLICATIONS

International Preliminary Report on Patentability issued in related International Application No. PCT/US2008/059422 on Oct. 20, 2009.
International Search Report and the Written Opinion of the International Searching Authority mailed Jun. 27, 2007 in connection with corresponding International Application No. PCT/US2008/59422.

* cited by examiner

Primary Examiner — Kim Huynh
Assistant Examiner — Brandon Kinsey
(74) Attorney, Agent, or Firm — Novak Druce Connolly Bove + Quigg LLP

(57) ABSTRACT

A clock signal may be aligned with a data signal by delaying the signals relative to each other until an edge of one signal aligns with an edge of the other signal, and then causing an inversion of the clock signal. A further variation may limit the relative delay period to one-half clock cycle and may use a double inversion of the clock signal.

16 Claims, 11 Drawing Sheets

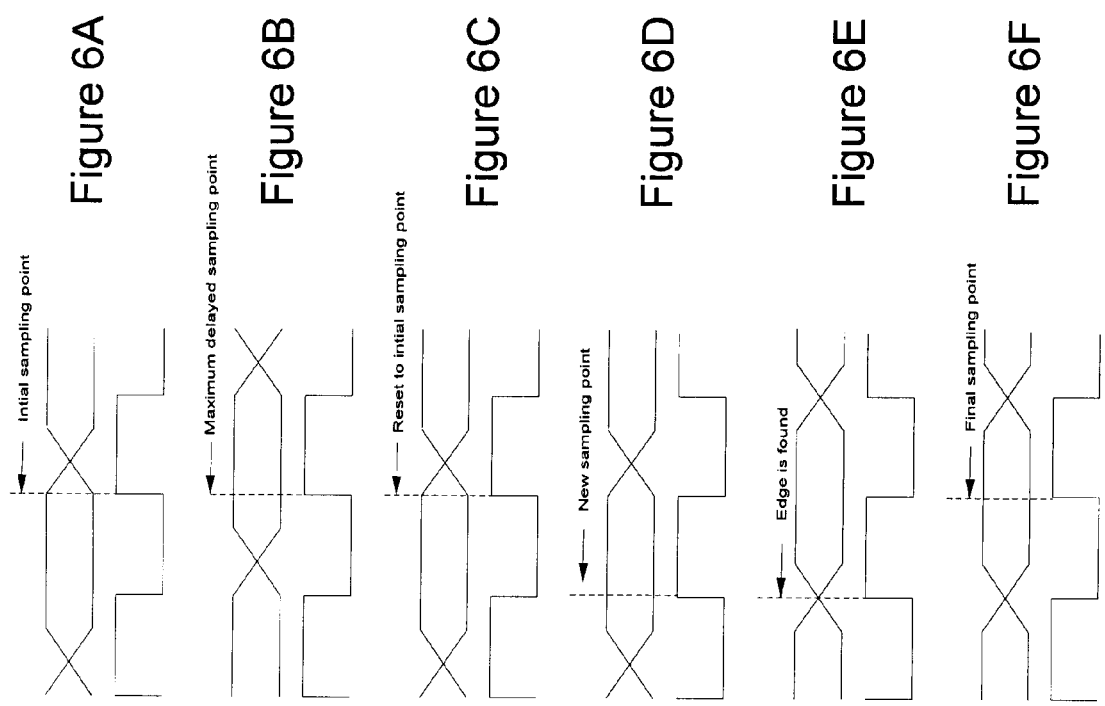

DYNAMIC PHASE ALIGNMENT

FIELD OF THE INVENTION

Various embodiments of the invention may relate, generally, to bit stream synchronization and timing.

BACKGROUND OF THE INVENTION

In, for example, a high-speed interface transmitting a stream of bits with a source-synchronous clock, it is common to perform serialization/deserialization in order to process the bit stream at a lower clock frequency. An example of such a system is depicted in FIG. 1. The serializer 11a in the transmitter 11 may perform serialization, where serializer 11a may take words of size N-bits per word at a rate of M words per second (which may, e.g., be stored in a FIFO buffer 11b prior to serialization) and send them out over a channel to a receiver 12 at a rate of M×N bits per second. The receiver 12 may then receive the bit stream and perform deserialization 12a to convert it back into words of size N-bits per word at the rate of M words per second (which may be stored, e.g., in a FIFO buffer 12b after deserialization). A system such as the one shown in FIG. 1 may include a source-synchronous clock (i.e., a clock sent from the same source as the data), which may be sent in-phase with the data from the transmitter 11 to the receiver 12.

However, a number of problems are possible that may result in mismatches between the data and the received clock. For example, board-level trace mismatches between different data channels, trace mismatches between data and clock, voltage/temperature differences, and process variations may all lead to differences in the arrival times of the clock and data at the input of a sampling receiver. For a system that transmits several data bits (e.g., data channels) with a single clock, the situation may be worse because each data channel may have a different skew with respect to the single clock, and this may further complicate the sampling of all the data channels using the same clock; an example of this is shown in FIG. 2. The skew between data channels could be so severe that there is no common window for sampling all data channels; an example of such a scenario is shown in FIG. 3, in which Data Channels 1, 2 and 3 may be such that, for example, any location where one may locate a sampling clock would result in data from different words being sampled. For example, if the sampling is performed at a time corresponding to line 31, the correct data may be obtained for Data Channel 1 and Data Channel 3, but not for Data Channel 2 (the sampling time may be too early). Similarly, if the sampling is performed at a time corresponding to line 32, correct data may be obtained for Data Channel 2 and Data Channel 3, but not for Data Channel 1 (the sampling time may be too late).

A possible solution to this problem is to use a technique called, "dynamic phase alignment." While some dynamic phase alignment techniques have been proposed and/or implemented, e.g., by Altera Corporation and Xilinx, Inc., such techniques may have drawbacks. For example, some may use specialized components that may not be readily available and/or easily fabricated, some may require relatively large amounts of space on a chip to implement, and some may need a relatively large period of time to achieve phase alignment.

SUMMARY OF EMBODIMENTS OF THE INVENTION

Various embodiments of the invention may relate to dynamic phase alignment techniques and apparatus, as well systems employing such techniques and/or apparatus.

BRIEF DESCRIPTION OF THE DRAWINGS

Various embodiments of the invention will now be described in detail in conjunction with the attached drawings, in which:

FIGS. 6A-6F pictorially depict a technique according to an exemplary embodiment of the invention;

DETAILED DESCRIPTION OF VARIOUS EMBODIMENTS

Figure 1:
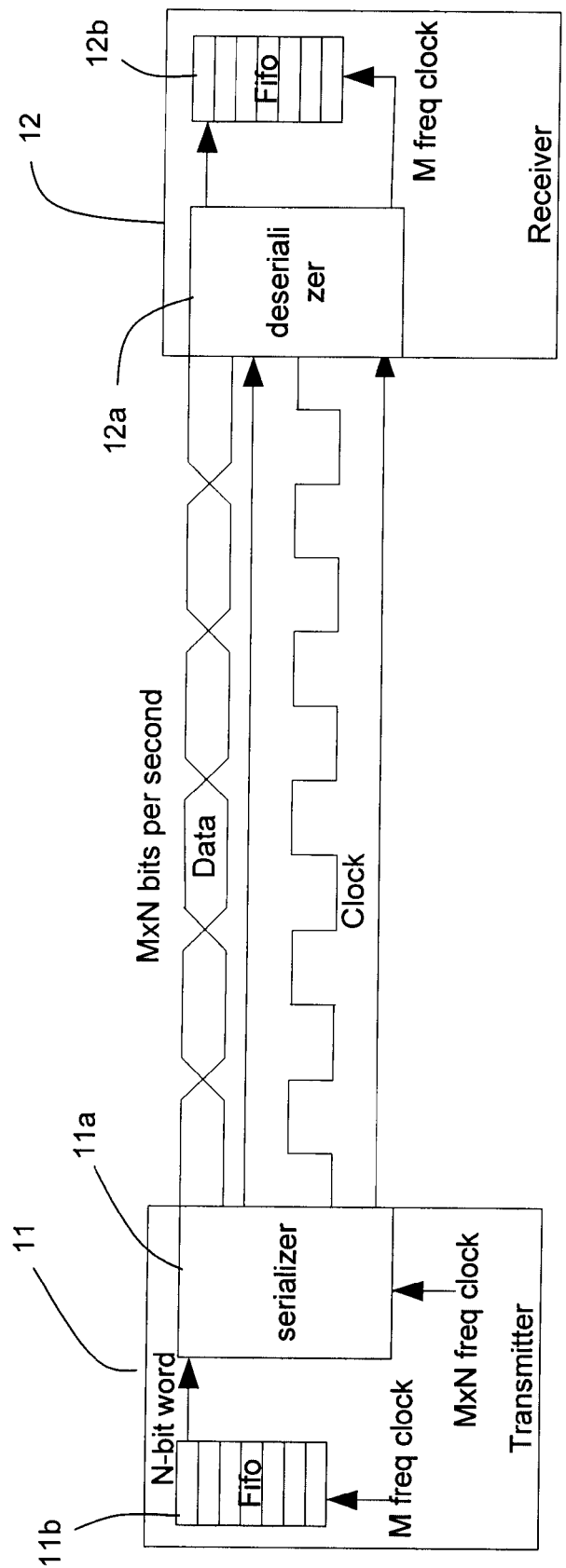
FIG. 1 shows a system in which various embodiments of the invention may be utilized.
Figure 2:
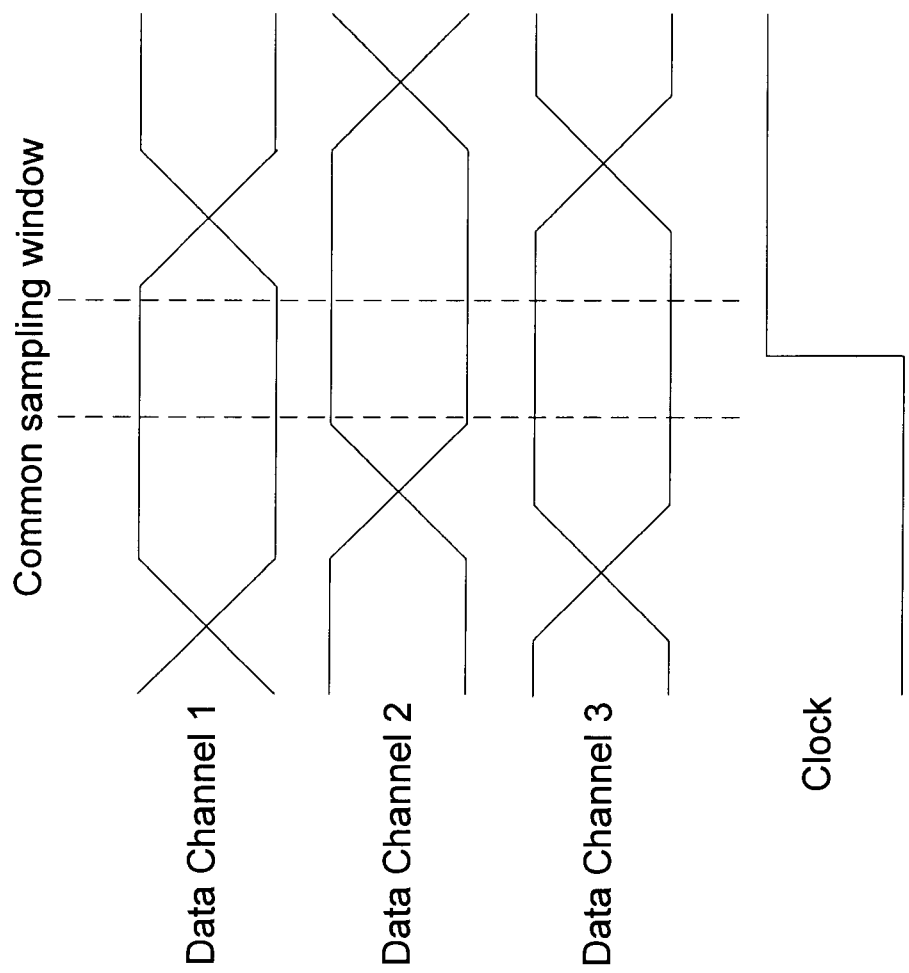
FIG. 2 shows an example of skew among various data channels with respect to a common clock.
Figure 3:
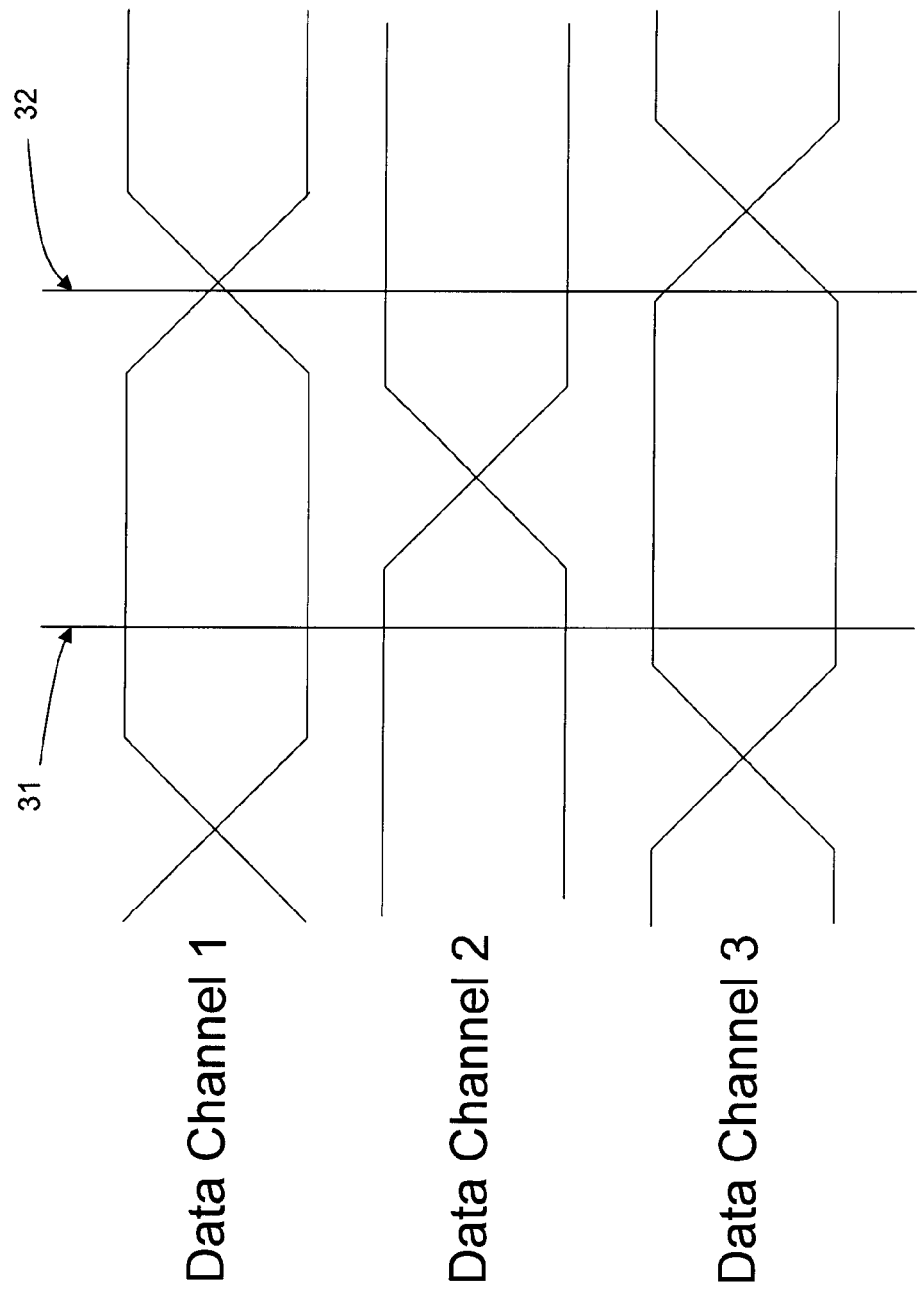
FIG. 3 shows an example of data channels skewed with respect to each other.
Figure 4A:
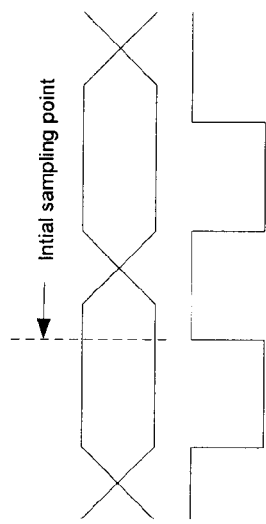
FIGS. 4A-4D pictorially depict a technique according to an exemplary embodiment of the invention.
Figure 4B:
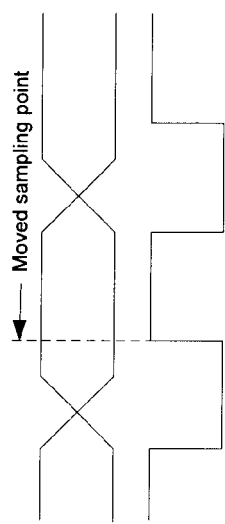
Figure 4C:
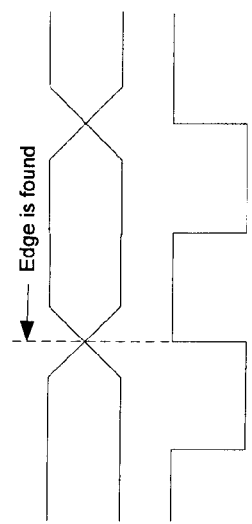
Figure 4D:
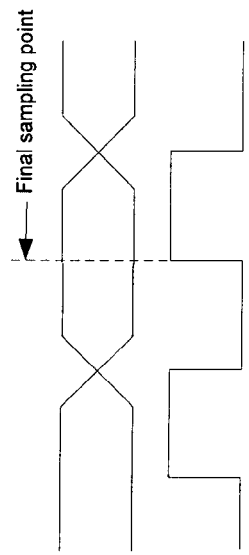

FIGS. 4A-4D pictorially represent a first embodiment of the invention. In each of these figures, the data channel is shown in the upper portion, and the clock signal is shown in the lower portion. According to the technique shown in FIGS. 4A-4D, the data channel, shown initially in FIG. 4A, may be delayed, e.g., by a programmable delay buffer chain, as shown in FIG. 4B, until a first edge is found, as shown in FIG. 4C. Once an appropriate data delay is found (to align the data periods with the clock periods), the internal sampling clock (as shown in the lower portion of FIGS. 4A-4D) may then be inverted to obtain a 180° phase shift of the sampling clock. Alignment may be checked, for example, by actually sampling the data and examining the samples thus obtained at that particular relative alignment between the clock signal and the data channel.

Describing FIGS. 4A-4D in further detail, if the initial sampling point, shown in FIG. 4A, is near the right edge of the data, then only a maximum total delay of one data period may be needed to align the data and the clock, thus resulting in a sampling point located at the center of a data period.

Figure 5A:
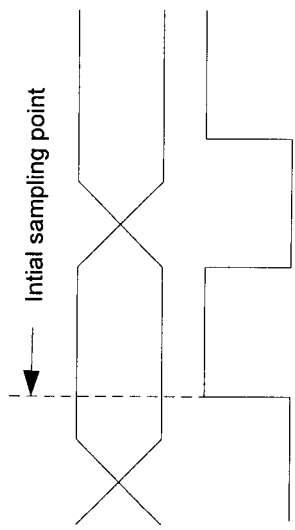
FIGS. 5A-5C pictorially depict a technique according to an exemplary embodiment of the invention.
Figure 5B:
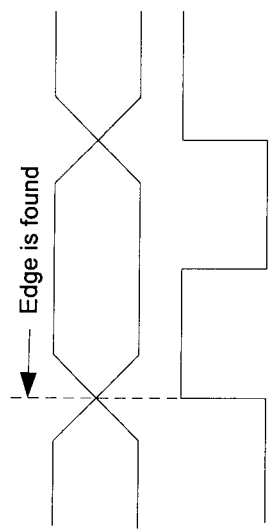
Figure 5C:
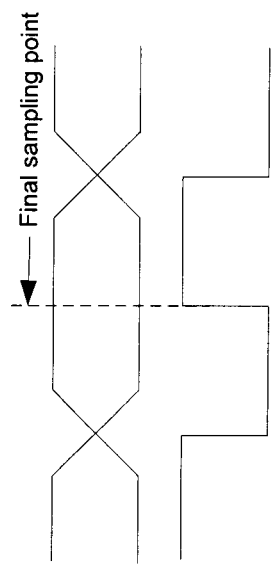

FIGS. 5A-5C and 6A-6F, taken in combination, reflect further embodiments of the invention that may be used to address the relative skewing of clock and data. The embodiment of FIGS. 5A-5C may start by using a sampling point in the left portion of the data window, as shown in FIG. 5A, if the data and clock channels line up as shown. Then, the data channel may be delayed up to one-half data period until the first edge is found, as shown in FIG. 5B. Once the first edge is found, the sampling clock may then be inverted to obtain a centered sampling point, as shown in FIG. 5C.

However, given a maximum delay of one-half period, it is possible that the clock and data channels may align such that the initial sampling point will be in the right portion of the data window, as shown in FIG. 6A. As a result, the first edge may not be found within the half-period delay provided, as shown in FIG. 6B. If the first edge cannot be found within a half period delay, then the delay may be reset to 0, to return to the initial sampling point, as shown in FIG. 6C. Then, one may invert the internal sampling clock, as shown in FIG. 6D; as a result, the new starting sampling point may then be located in the left portion of the data period. From that point, one may then proceed to delay the data channel, up to one-half period, until the first edge is found, as shown in FIG. 6E. Once the first edge is found, the sampling clock may then be un-inverted to obtain a centered sampling point, as shown in FIG. 6F.

As a result, an embodiment as in FIGS. 5A-5C and FIGS. 6A-6F, while more complicated than the embodiment of FIGS. 4A-4D, uses a smaller delay (one-half period), which may be implemented using less chip space than a full-period delay, which, in turn, may utilize less chip space than greater delays that may be found in some of the previously proposed alignment techniques.

Figure 7:
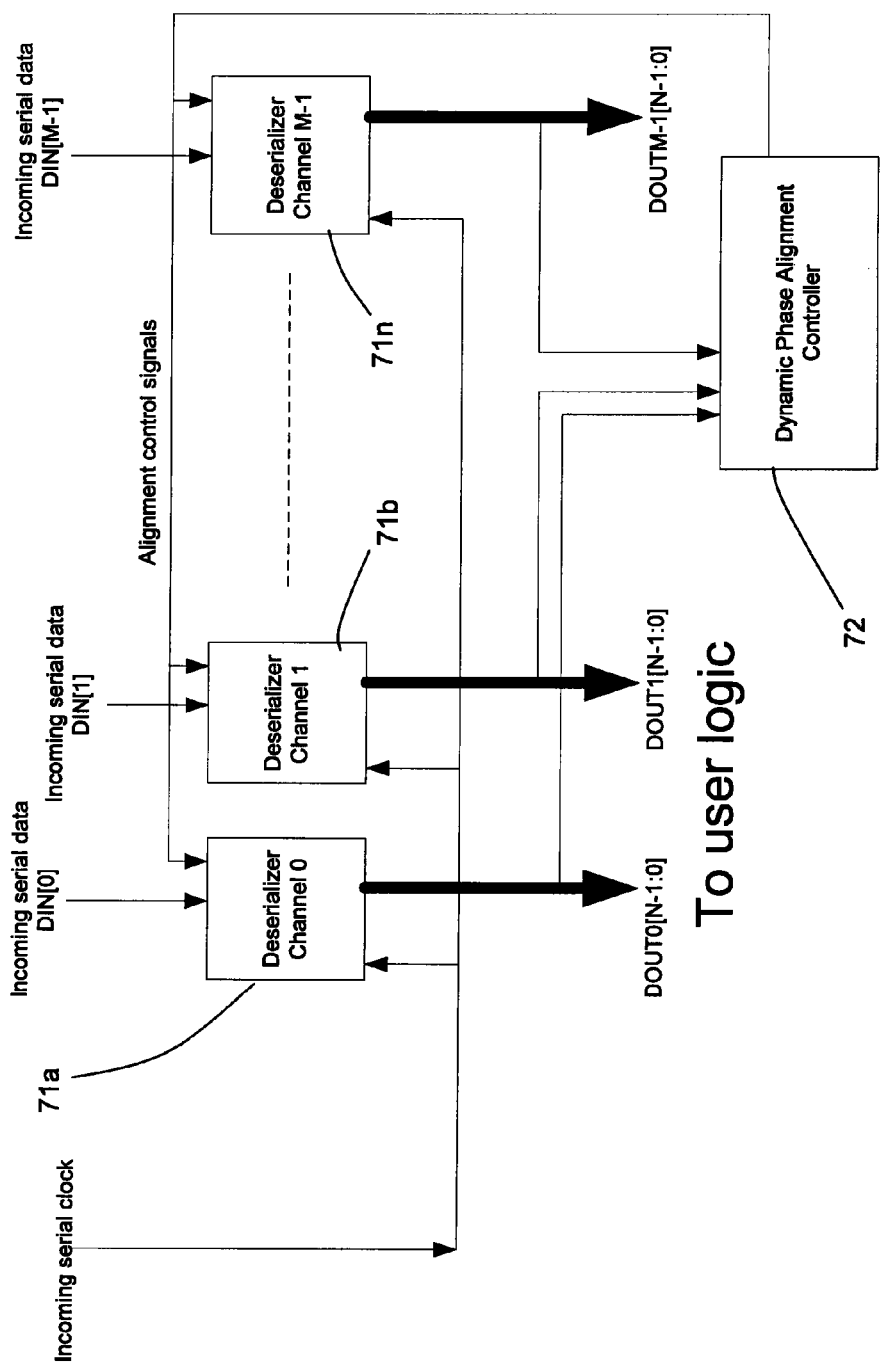
FIG. 7 shows a conceptual block diagram of apparatus that may be used to implement an exemplary embodiment of the invention.

FIG. 7 shows an exemplary embodiment of a deserializer system in which embodiments of the invention may be used. The deserializer system of FIG. 7 may include a number of deserializer channels, $71a$, $71b$, ..., $71n$, and a dynamic phase alignment controller 72. In FIG. 7, DIN[M-1:0] denotes the incoming serial data that may come from an external transmitter. As shown, the deserializer may have M channels, $71b$, ..., $71n$, that may be used perform deserialization on the incoming serial data to produce M channels of output data ($DOUT_0$ to $DOUT_{M-1}$). Each output data channel may comprise an N-bit bus, where N is the deserializer ratio (e.g., N=10 if the ratio is 10:1). The dynamic phase alignment controller 72 may be implemented, for example, in the form of a state machine or other processor that implements an embodiment of the invention as presented above. As shown, the dynamic phase controller 72 may take in the parallel output data from the deserializer channels, $71a$, $71b$, ..., $71n$, to determine whether or not it should delay the incoming serial data or invert the clocks used to sample the incoming data (as discussed above).

Figure 8:
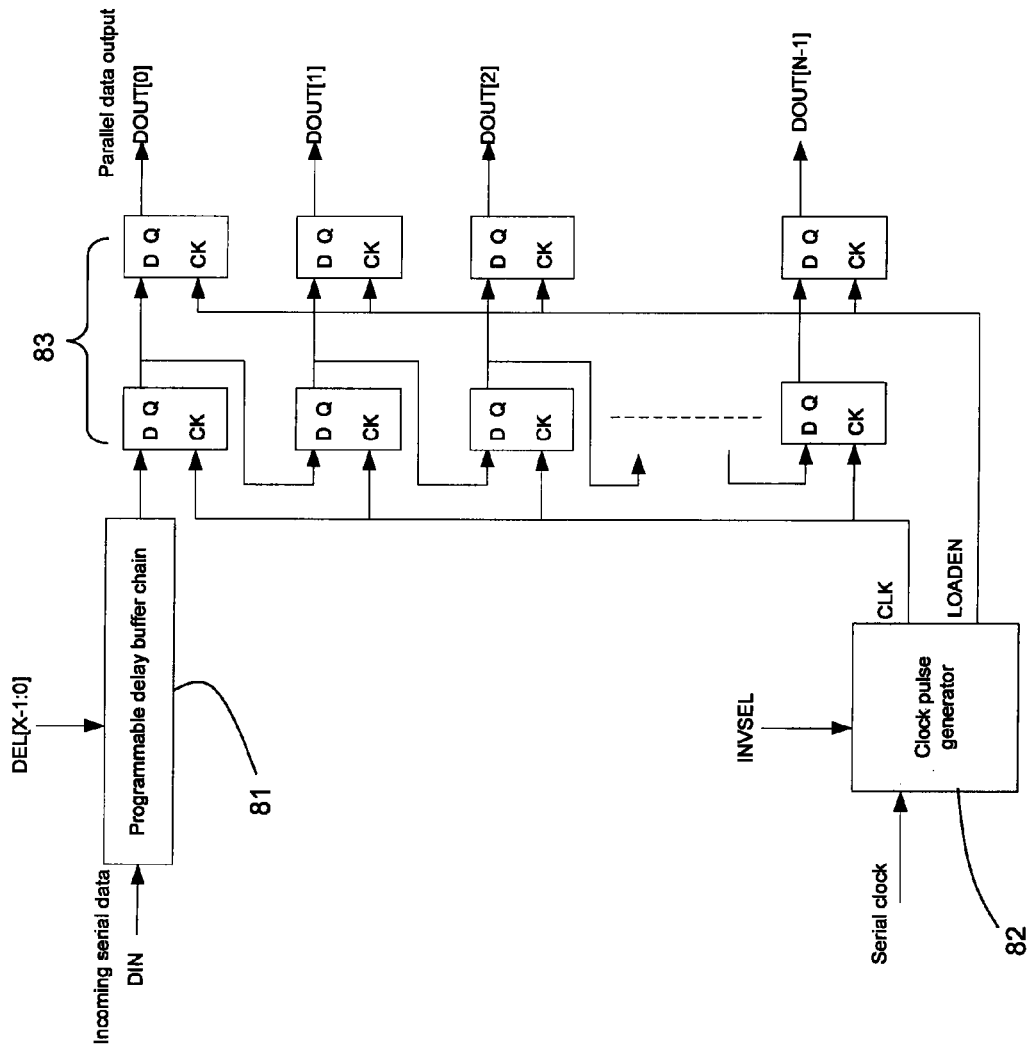
FIG. 8 shows a conceptual block diagram of further apparatus that may be used in implementing exemplary embodiments of the invention.

FIG. 8 shows an implementation of an exemplary embodiment of deserializer channels, $71a$, $71b$, ..., $71n$. The exemplary deserializer channel shown in FIG. 8 may include two rows of flip-flops 83, as well as a programmable delay buffer chain 81 and a clock pulse generator 82. The first row may serve as a shift register to sample the incoming serial data, while the second row may serve as a parallel output register to capture the deserialized data for output, e.g., to user logic. In the example discussed above, in which N represented the deserialization ratio, there may be N flip-flops per row; if there are N flip-flops per row, this may be used to accommodate a deserialization ratio of up to N. For example, if the deserializer channel is designed to support 2:1, 4:1, 6:1, 8:1 and 10:1 ratio, then the choice of N=10 may be used to support all of these deserialization ratios.

Figure 9:
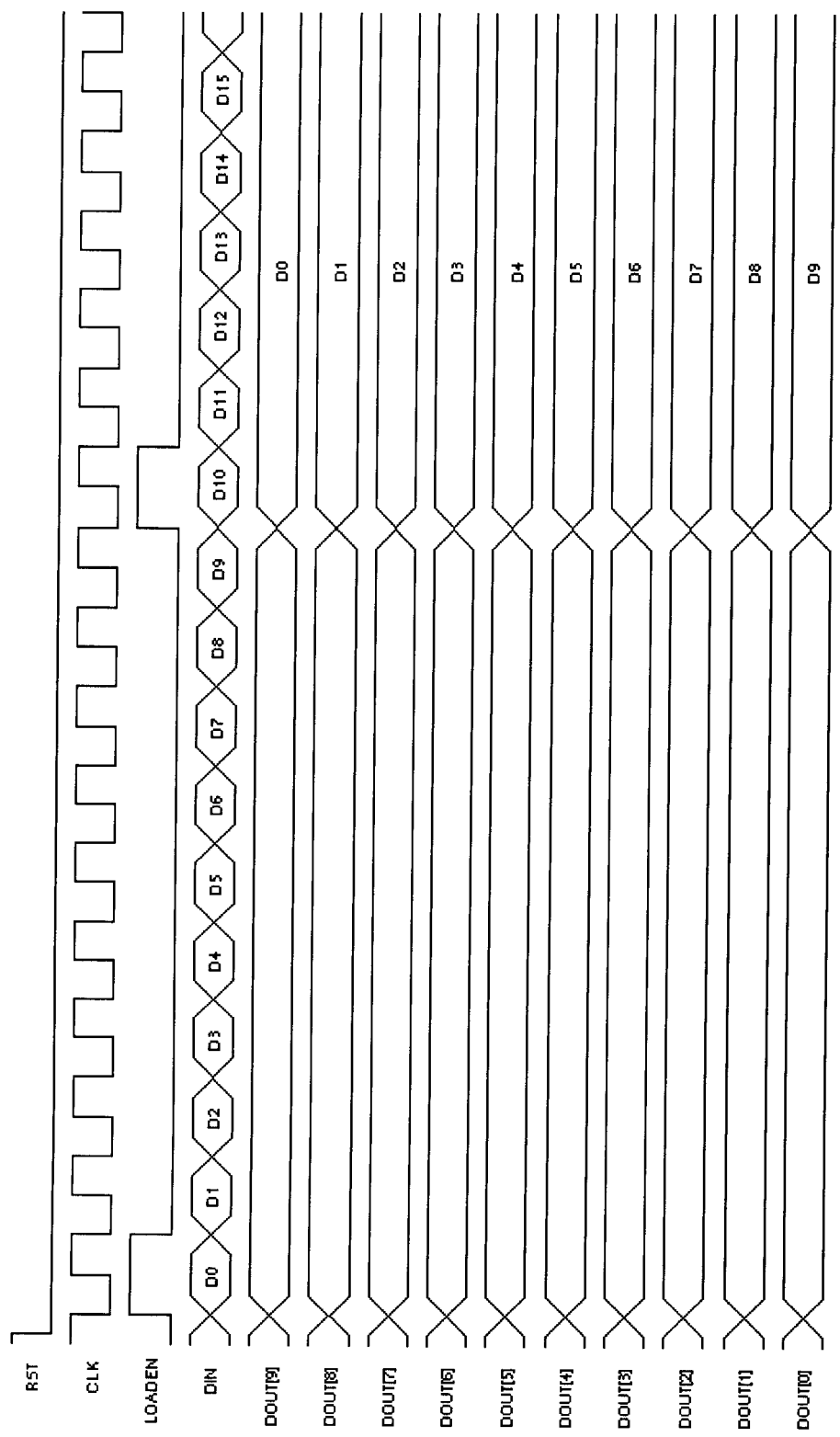
FIG. 9 shows a timing diagram according to an exemplary embodiment of the invention.

As discussed above, the exemplary deserializer channel of FIG. 8 may be used to support up to a maximum deserialization ratio of N if there are N flip-flops per row in the two rows of flip-flops 83. However, the timing may vary according to the actual deserialization ratio. FIG. 9 shows a timing diagram for the case of N=10, and in which there are ten flip-flops per row. As shown, a clock signal (CLK), which may be generated by clock pulse generator 82, may be used to enable the loading of incoming bit from the programmable delay buffer chain 81 into the ten flip-flops of the first row. Once this has been accomplished, a load enable (LOADEN) signal, which may also be generated by clock pulse generator 82, may be used to load the bits stored in the first row of flip-flops into the second row of flip-flops.

As shown in FIG. 8, the incoming serial data may be delayed by a programmable delay buffer chain 81. The programmable delay buffer chain 81 may be embodied in the form of a series of delay buffers, and the output may be tapped from the delay chain at an appropriate point, which may be selected by the control signal DEL[X-1:0], where $2^X$ is the number of taps of the delay chain. This may be implemented, for example, as a $2^X$-input MUX.

Figure 10:
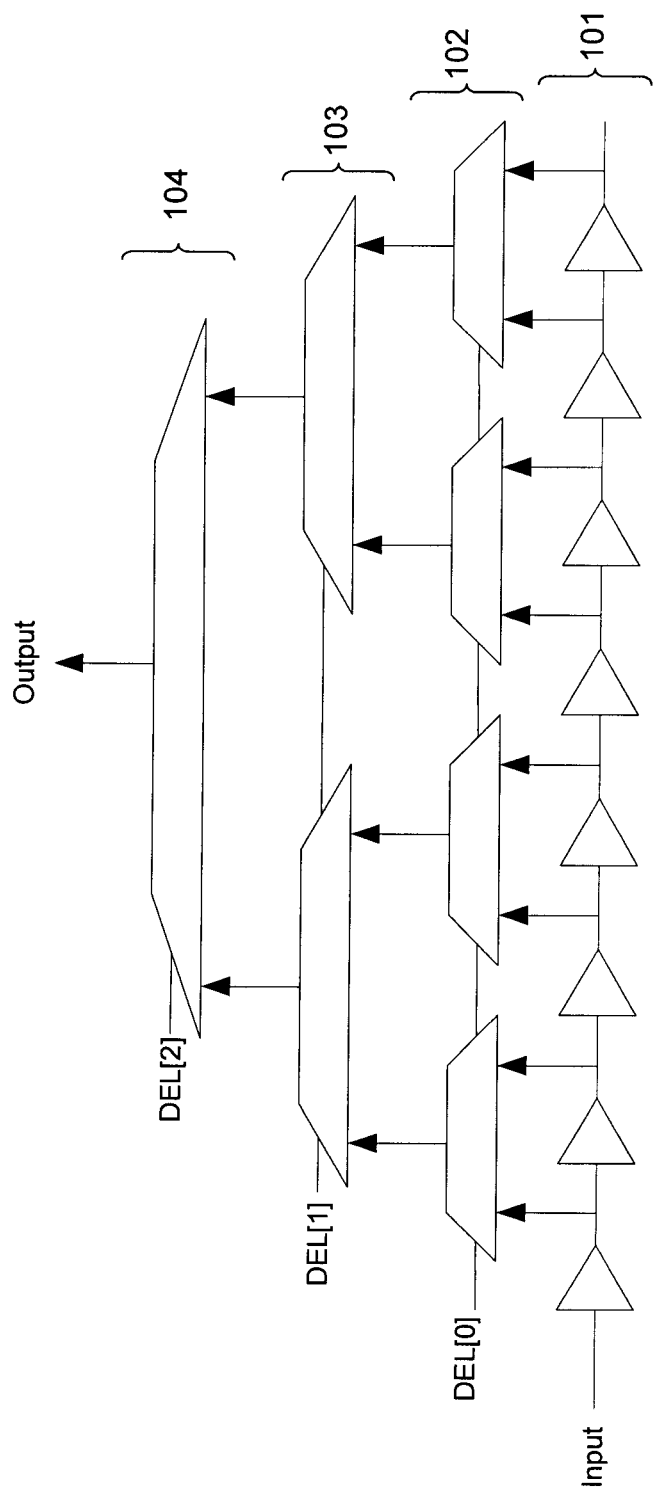
FIG. 10 shows further apparatus that may be used in implementing exemplary embodiments of the invention.

FIG. 10 shows an exemplary embodiment of a programmable delay buffer chain 81 having X=3. Data may be input to a series of delay buffers 101. The delay buffer outputs may then be fed to a first series of MUXes 102, whose outputs may be selected by DEL[0]. The outputs of the first series of MUXes 102 may form inputs to a second series of MUXes 103, whose outputs may be selected by DEL[1]. The outputs of the second series of MUXes 103 may then form the inputs to yet another MUX 104, whose output may be selected by DEL[2].

Figure 11:
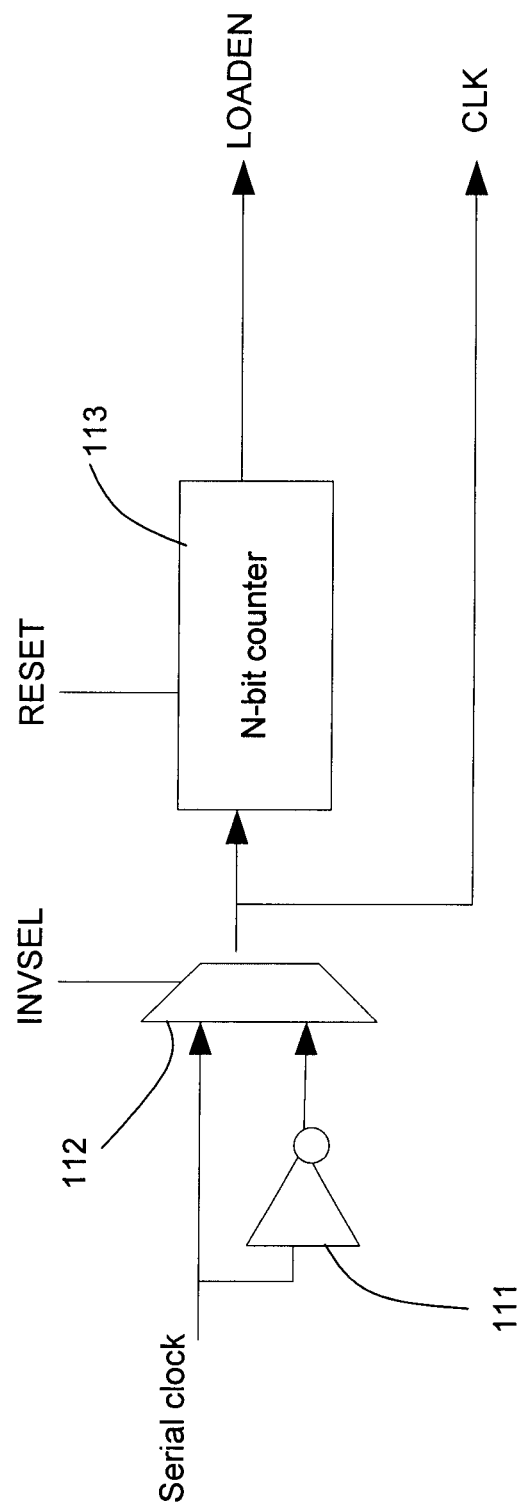
FIG. 11 shows yet further apparatus that may be used in implementing exemplary embodiments of the invention.

Clock pulse generator 82 may be used to create the CLK and LOADEN pulses based on the input serial clock, which may, for example, be transmitted along with the data. An exemplary embodiment of clock pulse generator 82, to which the invention is not limited, is shown in FIG. 11. Clock pulse generator 82 as embodied in FIG. 11 may include an inverter 111, a MUX 112, and an N-bit counter 113. The input serial clock may be fed to MUX 112, along with an inverted version created by inverter 111. The CLK pulse may then be obtained from the output of MUX 112. The CLK signal may be inverted or non-inverted depending on the value of the invert selection (INVSEL) signal. The decision to invert the clock may be based on one of the embodiments of the invention discussed above. The INVSEL signal may be generated, for example, by dynamic phase alignment controller 72, based on information provided to and/or generated by the dynamic phase alignment controller 72 (this may be based, e.g., on output data samples from the deserializer channels $71a$, $72b$, ..., $72n$), and may be fed to each of the deserializer channels $71a$, $71b$, ..., $71n$, and the INVSEL signal may be different for each deserializer channel, as may be appropriate.

As discussed above, the LOADEN pulse may be used to load the bits from the first row of the two rows of flip-flops 83 to the second row. LOADEN may be generated to be high (or low, depending on how the flip-flops 83 are triggered) one pulse in every N CLK pulses, and it may be 180 degrees out of phase with the CLK pulse. Hence, LOADEN may be generated by a counter 113 that takes in the CLK signal as its input clock and counts N times before driving a pulse.

In another embodiment, the CLK and LOADEN pulses may be generated by a phase-lock loop (PLL) or other timing generation apparatus, as long as these signals are triggered at appropriate intervals.

As noted above, dynamic phase alignment controller 72 may be embodied in several ways, including, for example, as hardware, software (for execution by a processor) and/or firmware. As such, various embodiments of the invention may comprise executable instructions/software code embodied on a machine-accessible medium for execution by a processor or for programming a state machine (e.g., an programmable hardware device) to perform according to an embodiment of the invention. Such machine-accessible media may include, for example, but are not limited to, RAM, ROM, flash memory, CDs, DVDs, EPROM, EEPROM, magnetic media (e.g., hard disks, magnetic tape, etc.) or other memory media. Such instructions may also be downloaded from some source (e.g., a machine-accessible medium) via a communication network (e.g., but not limited to, the Internet, a wireless network, a telephone network, etc.).

Various embodiments of the invention may further be implemented in a via-programmable structured application-specific integrated circuit (ASIC). Such a via-programmable ASIC may include various functional elements (e.g., logic, memory, et al.) with which the various embodiments of the invention may interact.

Various embodiments of the invention have been presented above. However, the invention is not intended to be limited to the specific embodiments presented, which have been presented for purposes of illustration. Rather, the invention extends to functional equivalents as would be within the scope of the appended claims. Those skilled in the art, having the benefit of the teachings of this specification, may make numerous modifications without departing from the scope and spirit of the invention in its various aspects.

We claim:

1. A method of aligning a clock signal with a data signal, comprising:
    starting with an initial sampling point according to the clock signal, delaying the data signal until a clock signal edge aligns with a data signal edge, wherein the total permissible delay is limited to at most one-half clock cycle; and
    inverting the clock signal when the clock signal edge aligns with the data signal edge.

2. The method according to claim 1 wherein said delaying further comprises;
    if a clock signal edge does not align with a data signal edge within one-half clock, resetting to said initial sampling point, inverting the clock signal to obtain an inverted clock signal, and delaying the data signal until a clock signal edge aligns with a data signal edge,
    wherein said inverting the clock signal comprises inverting the inverted clock signal.

3. A non-transitory machine-accessible medium containing executable instructions that, when executed by a processor, cause the processor to implement the method according to claim 1.

4. The method according to claim 1, further comprising:
    downloading, via a communication system, executable instructions that, when executed by a processor, cause the processor to perform said delaying and said inverting.

5. A hardware slate machine to implement the method according to claim 1.

6. An apparatus comprising:
    means for delaying a data signal until a clock signal edge aligns with an edge of the data signal, wherein a delay of the data signal is limited to at most one-half clock cycle; and
    means for inverting the clock signal.

7. The apparatus according to claim 6, further comprising:
    means for determining if a clock signal edge aligns with an edge of the data signal.

8. A via-programmable application-specific integrated circuit (ASIC) comprising:
    at least one functional element; and
    the apparatus according to claim 6,
    wherein the apparatus according to claim 6 is to be coupled to said at least one functional element to align a clock signal and a data signal to be input to or to be output from said at least one functional element.

9. A deserializatton system comprising:
    at least one deserializer channel to receive as input serialized data and an input serial clock and to output deserialized data; and
    a phase alignment controller coupled to provide at least one control signal to said at least one deserializer channel, said at least one control signal to adjust a relative delay between said input serialized data and said input serial clock until an edge of said input serialized data and an edge of said input serial clock are in alignment and to cause an inverted version of said input serial clock to be used for sampling the input serialized data, once said alignment has been achieved, wherein an adjustment in relative delay between said input serialized data and said input serial clock is limited to at most one-half clock cycle.

10. The deserializer system according to claim 9, wherein said at least one clock signal is further to reset to an initial starting point if said alignment is not achieved within one-half clock cycle of relative delay, to cause said clock to be inverted, and to restart adjusting the relative delay, and wherein the once alignment has been achieved, said inverted version of said input clock corresponds to an inverted version of the inverted clock.

11. The deserializer system according to claim 9, wherein at least one said deserializer channel comprises:
    a programmable delay buffer chain to receive said input serial data;
    a first set of flip-flops to receive data from said programmable delay buffer chain;
    a second set of flip-flops, equal in number to said first set of flip-flops, to accept data, in parallel, from said first set of flip-flops; and
    a clock pulse generator to receive said input serial clock and to output a clock signal to said it set of flip-flops and a load enable signal to said second set of flip-flops.

12. The deserializer system according to claim 11, wherein said at least one control signal comprises a signal to control a delay of said programmable delay buffer chain.

13. The deserializer system according to claim 11, wherein said at least one control signal comprises a signal to select whether or not to choose an inverted version of said input serial clock as said clock signal.

14. The deserializer system according to claim 11, Wherein said programmable delay buffer chain comprises one or more multiplexers and two or more delay buffers.

15. The deserializer system according to claim 11, wherein said clock pulse generator comprises:
    a multiplexer to be coupled to receive as inputs said input serial clock and an inverted version of said input serial clock; and
    a counter to be coupled to receive as an input an output of said multiplexer.

16. The deserializer system according to claim 15, wherein said multiplexer is to be coupled to receive a selection signal to be generated by said phase alignment controller.

* * * * *